United States Patent [19]

Brandt

[11] 4,065,926
[45] Jan. 3, 1978

[54] SUBTERRANEAN IRRIGATION SYSTEM
[76] Inventor: Edison R. Brandt, 951 DeSoto Road, Apt. 525, Boca Raton, Fla. 33432
[21] Appl. No.: 597,194
[22] Filed: July 18, 1975
[51] Int. Cl.² .................. E02B 13/00; N01G 25/06
[52] U.S. Cl. ........................................ 61/13; 47/1 R; 156/73.1; 239/207
[58] Field of Search .............. 61/13, 11, 10, 12; 239/207, 200, 201; 47/48.5; 156/73.1

[56] References Cited
U.S. PATENT DOCUMENTS 2,947,109  8/1960  Davis, Sr. et al. ............ 61/13 X
3,256,693  6/1966  Mathis ............................ 61/13
3,426,544  2/1969  Curtis ............................. 61/13
3,762,170  10/1973 Fitzhugh ........................ 61/13

Primary Examiner—Jacob Shapiro
Attorney, Agent, or Firm—William A. Danchuk

[57] ABSTRACT

An irrigation system employing, in part, a coarse screen or grid of flexible material having internal interconnecting passages for the flow of water or the like therethrough, the grid beng interred under the area of ground which is to be watered. Orifices are distributed along the interconnecting passages to release the water by gravity feed from a source or reservoir.

6 Claims, 6 Drawing Figures

SUBTERRANEAN IRRIGATION SYSTEM

BACKGROUND OF THE INVENTION

The problems involved with proper watering or irrigation of lawns and gardens are well known to every homeowner. Both manual and automatic systems and devices are available for providing water to the lawn and garden areas.

At present, one of the most available methods of lawn and garden irrigation is that employing a series of water sprinklers strategically located throughout the area to be watered. These sprinklers are in turn connected to a private pump and well or to the local municipal water supply. The disadvantages of such systems are well known to many, especially those who have had them installed and correctly maintained.

In addition to the expense of installation (some systems may cost several thousand dollars) and maintenance, there exist the additional problem areas relating to practical as well as aesthetical considerations. Specifically, the sprinkler systems noted above suffer from water wastage, incomplete watering, breakage and prevention of lawn and garden usage during their operation. Additionally, their appearance is aesthetically disruptive and they may cause rusting and spotting of walls, furniture and other related lawn and garden appurtenances.

SUMMARY OF THE INVENTION

The present invention is directed to an irrigation system which retains all of the advantages of known sprinkler systems, while doing away with substantially all of the disadvantages. The system employs a grid pattern of interconnected flow passages having holes strategically formed therein which is interred beneath the surface of the area to which water, or any liquid, is to be applied. The grid pattern of flow passages is fed through an inlet using a gravity feed from the source of water to the holes. Due to its interment beneath the ground and absence of high pressure, a majority of the problems associated with sprinkler systems are alleviated. Furthermore, because of its simple and almost indestructable nature, it has extremely low installation as well as maintenance costs and may be easily installed by any homeowner. Additionally, the system permits the periodic addition of either pesticides or fertilizers when desired.

In a preferred embodiment of the invention, a grid of interconnected flow passages is formed from two sheets of plastic which are heat sealed about their edges as well as within their center portion so as to form a series of perpendicularly oriented and intersecting lines or flow passages. It is through these passages that the water from a reservoir flows. Located at spaced intervals, and having specifically designed sizes directly proportional to their distance from the grid "inlet", are apertures formed in the flow passages. The apertures permit water within the grid pattern to escape to the soil being watered.

In addition to being inexpensive, relative to both installation and maintenance, the grid pattern of flow passages located beneath the surface of a lawn or garden would not interfere with the area's normal use and could be customized by the user to any area of his property.

Accordingly, it is a primary object and feature of the present invention to provide an irrigation system including a grid pattern of interconnected flow passages which is interred within the ground, the flow passages having apertures formed therein for permitting water or the like, which flows from an above-ground reservoir through a connecting tube to the grid of flow passages, to escape to the ground to be watered.

It is another object and feature of the present invention to provide an inexpensive and easily installed and maintained irrigation system which employs a subterranean distribution mechanism.

It is a further object and feature of the present invention to provide an irrigation system employing a grid system of interconnected flow passages having apertures formed therein for permitting water, which is gravity fed to the grid system from a reservoir, to enter the soil, the grid system being formed of selectively sealed sheets of plastic.

It is still a further object and feature of the present invention to provide a method for manufacturing a sheet of grid patterned flow passages from two superimposed sheets of plastic which are sealed along specific lines to provide a network of closed but interconnected tubes having holes therein which distribute water to the soil in which the grid pattern of flow passages is interred.

Other objects and features of the present invention will in part be obvious and will in part become apparent from the detailed description to follow taken in conjunction with the accompanying drawings.

BRIEF DESCRIPTION OF THE DRAWINGS

The novel features that are considered characteristic of the invention are set forth with particularity in the appended claims. The invention itself, however, both as to its structure and its operation together with the additional objects and advantages thereof will best be understood from the following description of the preferred embodiments when read in conjunction with the accompanying drawings wherein:

DETAILED DESCRIPTION OF THE INVENTION

Figure 1:
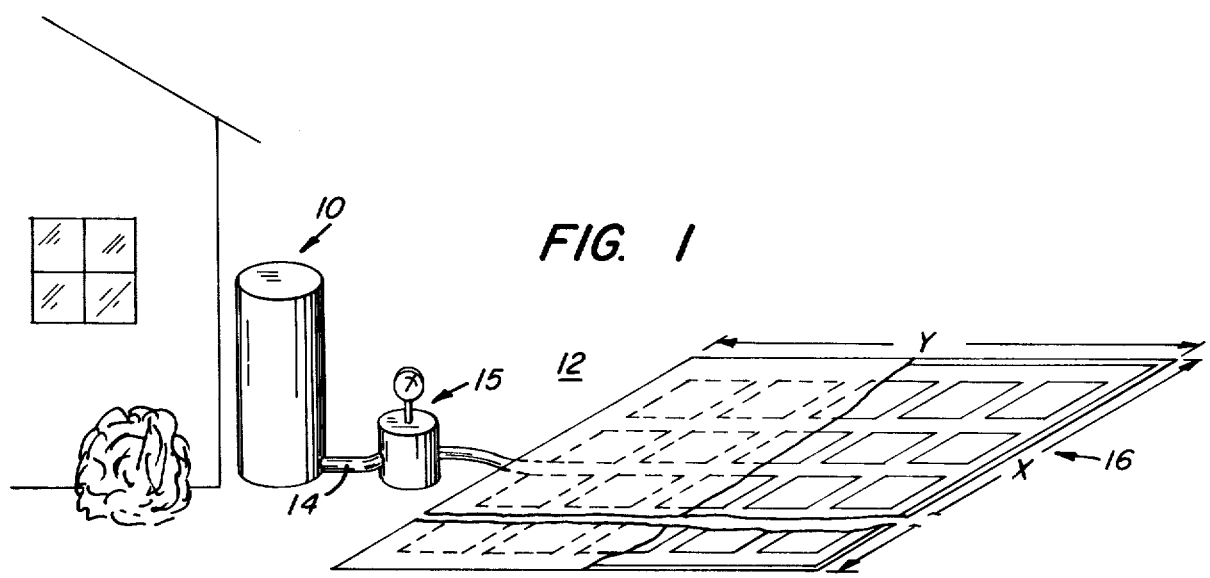
FIG. 1 is a schematic representation of the irrigation system of the present invention.
Figure 2:
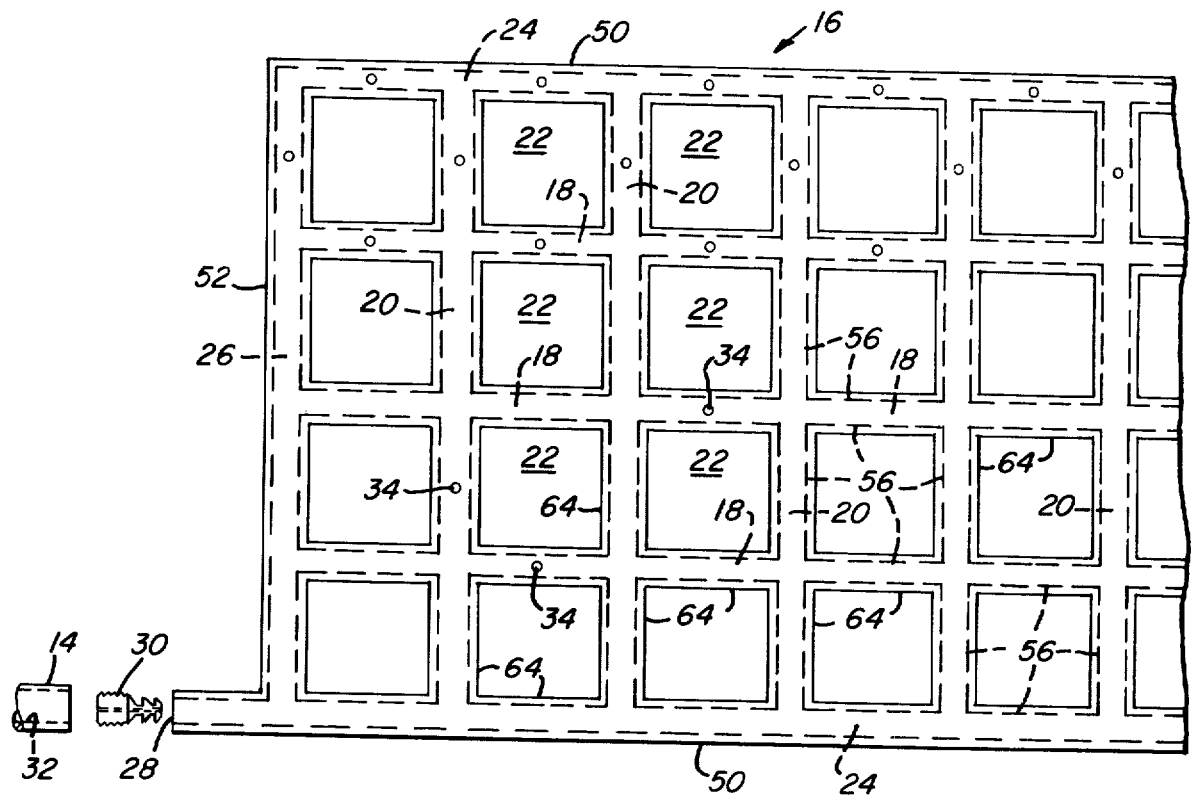
FIG. 2 is a partial plan view of one portion of the preferred embodiment of the irrigation system shown in FIG. 1.

A preferred embodiment of this invention, which may be best understood by first referring to FIGS. 1 and 2 of the drawings, is designed for employment with a liquid reservoir shown generally at 10 in FIG. 1. Reservoir 10 may serve as a receptacle for any liquid, such as fertilizers or pesticides, but generally would act as a convenient holder for water. Due to the gravity feed nature of the irrigation system to be described below, reservoir 10 should have more than minimal height above the ground 12 to provide the low feed pressure (less than 15 p.s.i.) necessary in such systems.

A connecting tube 14 is located between the reservoir 10 and the distribution mechanism of the present invention. Tube 14 may take any convenient configuration such as rubber hosing or the like. However, due to its partial interment within ground 12, it should preferably be made from a plastic material such as vinyl chloride in order to prevent its corrosion or rusting. The tube 14 is connected, in turn, to a water distribution grid 16 which is located wholly beneath the ground 12.

The water distribution grid 16, while it may take a variety of configurations is, in the preferred embodiment, formed having a generally perpendicularly oriented series of flow passages or the like so as to form a generally rectangular shaped grid. The grid 16 shown in FIG. 1 may be of any convenient size having dimensions x and y with the only limitations being weight considerations relating to moving and installation.

Figure 3:
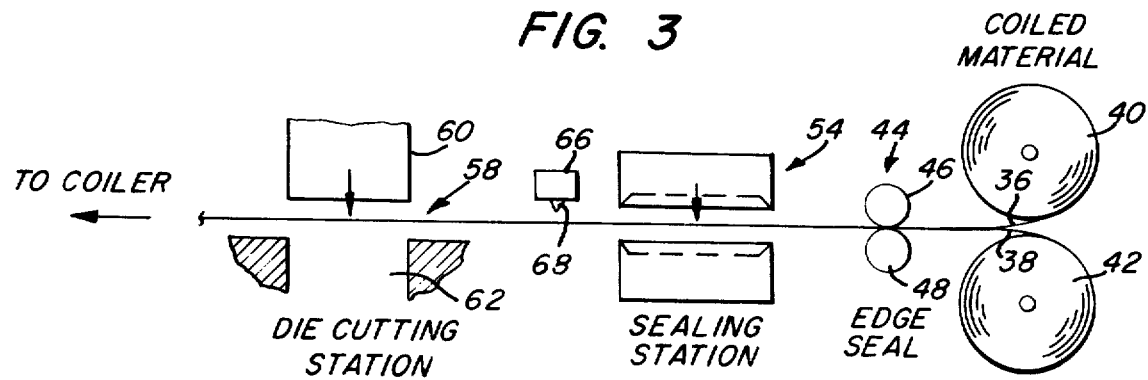
FIG. 3 is a schematic representation of a number of stations necessary in a preferred method of producing the embodiment of the invention shown in FIG. 2.

Looking to FIGS. 2 and 3, there is shown a portion of a preferred embodiment of the distribution grid 16 of the present irrigation system and the apparatus for manufacturing the preferred embodiment. As seen in FIG. 2, grid 16 is formed having a plurality of perpendicularly oriented flow passages 18 and 20. Positioned between adjacent flow passages are voids 22 having a generally rectangular shape which, as they are not functional, are removed to permit root growth and drainage of rainfall. Located about the top and bottom portions of the periphery of distribution grid 16 is an edge flow passage 24. Similarly, lateral edge flow passages 26 are provided at each lateral end of the grid. Provided in one convenient corner or edge of the grid is an opening 28 which, in conjunction with a regulation gauge 15 connected on tube 14, permits a controlled flow of water to enter the grid 16 and flow through the passages 18 and 20. An adapter plug 30 is configured to interface between opening 28 in grid 16 and the end 32 of tube 14. Additionally provided along the whole of grid 16 of flow passages 18, 20, 24 and 26 are a plurality of holes or apertures 34 for permitting the exit of the liquid being conveyed from the grid 16. Due to the variety of parameters involved, e.g., flow patterns, frictional loss, drainage and moisture-holding capacity of the soil, there must be a counterbalancing factor which can equalize the parameters thereby providing for substantially even distribution of the liquid. One way of achieving such balance is by varying aperture size and/or spacing. The specific circumstances presented in a given irrigation application will obviously affect the above-noted size and/or spacing to a large degree. However, for the majority of average irrigation applications, it should be noted that the holes or apertures which are closest to the opening 28 will have a smaller size than those farther from the opening, thereby equalizing factors of flow and frictional loss. It should be noted that other factors, when present, will add additional changes to hole size and configuration. Such changes may be made in the field or may be made, at least in part, during manufacture.

FIG. 3 is a schematic representation of the steps and apparatus involved in the manufacture of the distribution grid 16. The distribution grid 16 is formed, at least in the preferred embodiment, from two superimposed plastic sheets 36 and 38 which are coiled upon two separate storage rollers 40 and 42. Plastic sheets 36 and 38 may be of any one of a variety of plastics suitable for interment below ground. Several, such as polyethylene or vinyl chloride, have been found to not only exhibit good static properties which resist deterioration, but in addition, have very low moisture absorption and exhibit low coefficients of friction for not appreciably interferring with water flow with the flow passage. Moreover, such plastics may be made flexible without excessive heating, remain suitably rigid at ambient temperatures, and do not become brittle even at temperatures approaching −60° F.

The two sheets 36 and 38 are superimposed and are pulled through an edge sealing device 44 which, in the preferred embodiment, is composed of two separate rollers 46 and 48 which seal the peripheral edges 50 and 52 of the grid 16. In this regard, seal 52 may be considered an end seal, although this difference is simply one of semantics. The entire periphery of the two superimposed sheets 36 and 38 is thus sealed, leaving only opening 28 in a non-sealed state. It should be noted that a variety of sealing methods such as cementing, heat sealing or ultrasonic welding may be employed to "seal" the two sheets together. Any of such methods, or any other sealing methods, may be employed which causes a watertight seal in both this sealing operation and the one which is about to be described.

Subsequent to edge sealing, the two sheets are "internally" joined or sealed at a sealing station 54 which seals the two sheets together about the rectangular or square-shaped area defined by lines 56 as shown in phantom in FIG. 2. The sealing station 54 may include only a single block which must be repeatedly moved about the two sheets, or it may selectively seal the entire area within the edge seals to form the grid patter of interconnected flow passages shown in FIG. 2. It should be noted that the only difference between the two systems is one of manufacturing convenience. After sealing, the next step is the making or forming of apertures or perforations 34 in the flow passages 18, 20, 24 and 26. This is achieved by a perforator mechanism 66 which may take a variety of configurations. However, one involving a pin 68 is shown which selectively pierces one or both of the plastic sheets to provide exit holes for the water.

After the two sheets have been selectivey joined and pierced, the areas within the lines 56 which are no longer a functional portion of the distribution grid 16 due to their position "outside" of the functional flow passages 18 and 20, 24 and 26, are removed at a die cutting station 58. Station 58 includes a punch mechanism 60 and a die element 62 which remove the square or rectangular-shaped sheet material between the flow passages thus leaving the void 22. The die cutting station removes material along the lines 64 which lie within the sealing lines 56, thereby leaving sufficient material between the two for preventing accidental interference with the sealing lines. Additionally, it should become evident that the removal of the sheet material lying within the die cut lines 64 is a convenience for weight reduction and material usage. Moreover, the removal of such sheet material provides the open spaces in the sheet which permit proper drainage and does not interfere with root growth.

The final step involved in manufacture is conveniently storing the sheet material on rollers or coilers (not shown) for subsequent shipping to the user. While such sheet material may be made in standard widths and lengths, which afford convenience to the user, it should be obvious that the mere employment of a "home" sealer would be all that would be necessary to "customize" the sheet of distribution grid to one's own lawn and garden.

Figure 4:
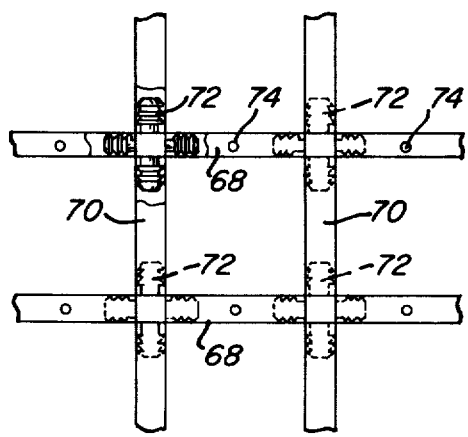
FIG. 4 is an alternative embodiment of a portion of the irrigation system of the present invention.
Figure 5:
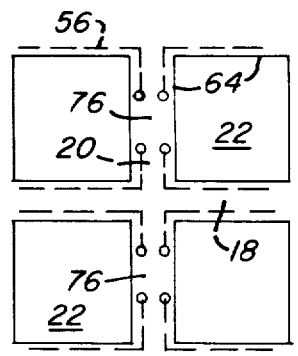
FIG. 5 is another alternative embodiment of a portion of the irrigation system of the present invention.
Figure 6:
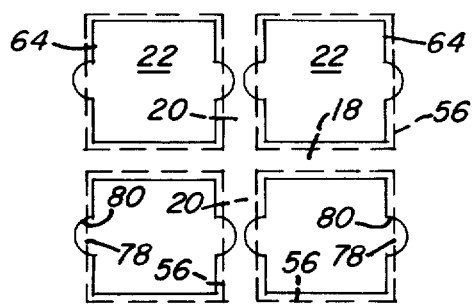
FIG. 6 is still another alternative embodiment of the irrigation system of the present invention.

Looking to FIGS. 4–6, there are shown a few alternative embodiments by which the present irrigation system may in part be practiced. FIG. 4 illustrates a small portion of a liquid distribution grid which utilizes a plurality of horizontally and vertically oriented hollow plastic tubes 68 and 70, respectively, which are flowably interconnected through four-way connectors 72 made from plastic or the like. The grid system of interconnected flow passages 68 and 70 might be constructed in convenient sizes in a factory, or may be constructed by the user to fit the specific configuration of his lawn or garden. Holes such as at 74 would be provided for permitting exit of the water from the grid system in the same manner as holes 34 did in the preferred embodiment.

FIGS. 5 and 6 show various ways of automatically forming holes or apertures in the flow passages of the preferred embodiment of the grid system seen in FIG. 2 alleviating the specific need for the aperture maker 66. In particular, FIG. 5 shows the formation of apertures 76 in the flow passages by selectively interrupting the sealing station operation at certain points along lines 56 to create sealing voids for allowing water or the like to escape from the flow passages through the aperture 76 and into the ground. Moreover, FIG. 6 shows the formation of holes or apertures 78 in the flow passages (which may include passages 18 as well as passages 20) by modifying the die cutting operation such that "bites" 80 are selectively taken out at the same time as the die-cut along lines 64. This operation would create interferences with the flow passages and thereby result in the formation of holes 78 as is shown in FIG. 6.

It will be seen that by this invention there is provided a much improved irrigation system employing a distribution grid formed of a plurality of interconnected flow passages which is interred within the ground. The system is fed from a liquid reservoir, which may be automatically filled or not, and which may be inconspicuously located beside the house. The irrigation system does not interfere with plant growth or usage above the surface and would be constructed and configured to withstand temperature extremes. Due to its basic and simple structure, the system would be within the pocketbook of any homeowner who is willing to install it himself or within most pocketbooks if someone else is hired for the installation. Customizing and fitting the system to any particular tract of land insures adequate watering or liquid application without the wet walkways, stained walls, and maintenance expenses which are part of an above-ground sprinkler system.

This invention may be practiced or embodied in various other ways without departing from the spirit or essential character thereof. The preferred embodiments described herein are therefore illustrative and not restrictive, the scope of the invention being indicated by the appended claims and all variations which come within the meaning of the claims are intended to be embraced therein.

I claim:

1. An irrigation system for selectively conveying and applying a liquid from a source of such liquid to an area of ground to which such liquid is to be applied while avoiding interference with the above-ground use of such area, said irrigation system comprising:

a plurality of flow passages connected relative to one another so far as to form an array of said flow passages having an entrance thereto, the array having an area substantially equal to such area of ground, said plurality of flow passages being formed from two sandwiched sheets of plastic periodically sealed together at various common non-overlapping areas to form a resultant grid pattern of non-sealed interconnected passages which form said array of said interconnected flow passages, said plurality of flow passages having means defining apertures therein of a size and quantity as to effect the substantially even distribution of such liquid to such ground area, said plurality of flow passages being entirely interred within such ground area; and means for connecting such array of said plurality of flow passages to such source of such liquid.

2. The irrigation system of claim 1 in which said system further includes means for regulating the flow of liquid from such source of liquid to said flow passages, said regulating means being located along said connecting means.

3. An irrigation system for applying a liquid from a source of such liquid to an area of ground, said system comprising:

a sheet of flexible grid material formed from two sheets of plastic sandwiched together and selectively sealed together at certain specific common non-overlapping areas to form a resultant grid of non-sealed areas of the two sheets to form interconnected flow passages for such liquid, said sheet of flexible grid material having said sealed areas being removed, said sheet being interred below such area of ground and including means defining apertures along said flow passages for permitting the exit of such liquid from said grid material to such ground area; and means for connecting said flexible grid material to such source of liquid.

4. The irrigation system of claim 3 further including means for regulating flow of liquid from such source of liquid to such grid material.

5. The irrigation system of claim 3 in which portions of the perimeters of said certain specific common non-overlapping areas are not sealed so as to form outlets for such liquid flowing through said grid of interconnected flow passages when said areas are removed from said sheet.

6. The irrigation system of claim 3 in which said sealed areas are polygons.

* * * * *